United States Patent [19]

Newton

[11] Patent Number: 5,638,285

[45] Date of Patent: Jun. 10, 1997

[54] SYSTEM FOR DISPENSING DRY AGRICULTURAL CHEMICALS

[75] Inventor: Cloyce D. Newton, Divernon, Ill.

[73] Assignee: Ingersoll-Dresser Pump Company, Liberty Corner, N.J.

[21] Appl. No.: 734,419

[22] Filed: Oct. 16, 1996

Related U.S. Application Data

[63] Continuation of Ser. No. 172,367, Dec. 22, 1993, abandoned.

[51] Int. Cl.$^6$ ............................................. B65D 83/06
[52] U.S. Cl. ........................... 364/479.11; 364/479.12; 111/130; 221/124; 222/129
[58] Field of Search ........................ 364/424.01, 479, 364/424.07, 479.01, 479.11, 479.12, 479.14; 221/92, 123, 124, 129; 111/104, 130, 8; 222/129, 544

[56] References Cited

U.S. PATENT DOCUMENTS

| | | | |
|---|---|---|---|
| 3,685,468 | 8/1972 | Paige et al. | 111/11 |
| 4,107,777 | 8/1978 | Pearson et al. | 364/479 X |
| 4,225,930 | 9/1980 | Steffen | 364/555 |
| 4,277,833 | 7/1981 | Steffen | 364/555 |
| 4,333,096 | 6/1982 | Jenkins | 340/684 |
| 4,376,298 | 3/1983 | Sokol | 364/551 |
| 4,491,241 | 1/1985 | Knepler | 221/3 |
| 4,495,584 | 1/1985 | Yoshida | 364/479 |
| 4,551,801 | 11/1985 | Sokol | 364/424 |
| 4,705,220 | 11/1987 | Gandrud et al. | 239/654 |
| 4,714,196 | 12/1987 | McEachern et al. | 239/62 |
| 4,896,615 | 1/1990 | Hood et al. | 111/177 |
| 4,901,655 | 2/1990 | Magda | 111/8 |
| 4,926,768 | 5/1990 | Magda | 111/11 |
| 5,024,356 | 6/1991 | Gerling et al. | 222/312 |
| 5,029,624 | 7/1991 | McCunn et al. | 141/346 |
| 5,109,347 | 4/1992 | Quick, Jr. et al. | 364/479 |
| 5,110,521 | 5/1992 | Moller | 364/479 X |
| 5,156,372 | 10/1992 | Conrad | 251/65 |
| 5,240,324 | 8/1993 | Phillips et al. | 364/479 X |
| 5,323,720 | 6/1994 | Moore | 111/8 |

FOREIGN PATENT DOCUMENTS

WO 93/04434  3/1993  WIPO.

*Primary Examiner*—Collin W. Park
*Attorney, Agent, or Firm*—Michael H. Minns; Robert F. Palermo

[57] ABSTRACT

A material dispensing system for agricultural pesticides and chemicals. The system uses distributed processing with a main controller and a plurality of sub-controllers to control pesticide metering devices. The metering devices are attached to a pesticide container.

11 Claims, 3 Drawing Sheets

SYSTEM FOR DISPENSING DRY AGRICULTURAL CHEMICALS

This application is a continuation of application Ser. No. 08/172,367 filed Dec. 22, 1993, now abandoned.

BACKGROUND OF THE INVENTION

This invention relates generally to material delivery systems for granular or solid pesticides and more particularly to material dispensing systems using distributed processing.

In markets requiring the usage of chemicals, often hazardous substances, the Environmental Protection Agency and other regulatory bodies are imposing stricter regulations on the transportation, handling, dispersion, disposal, and reporting of actual usage of chemicals. These regulations, along with public health concerns, has generated a need for products that address these issues dealing with proper chemical handling.

To reduce the quantity of chemicals handled, the concentration of the chemical, as applied, has been increasing. This has raised the cost of chemicals per unit weight and has also required more accurate dispensing systems. For example, typical existing systems for agricultural pesticide dispensing use a mechanical chain driven dispenser. Normal wear and tear on these mechanical dispensers can alter the rate of pesticide applied by as much as 15%. For one typical chemical, Force®, a pyrethroid type insecticide by ICI, an over-application rate of 15% can increase the cost of the insecticide by $750 over 500 acres.

Since many of the current pesticide systems are mechanical systems, any record keeping and reporting must be kept manually.

The foregoing illustrates limitations known to exist in present material delivery systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a system for dispensing dry agricultural chemical comprising: a master controller; a plurality of chemical containers, each chemical container having means for dispensing chemical at a metered rate from said container; a plurality of secondary controllers for actuating the means for dispensing chemical, each secondary controller receiving command data from the master controller and controlling the means for dispensing in response to the said data.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
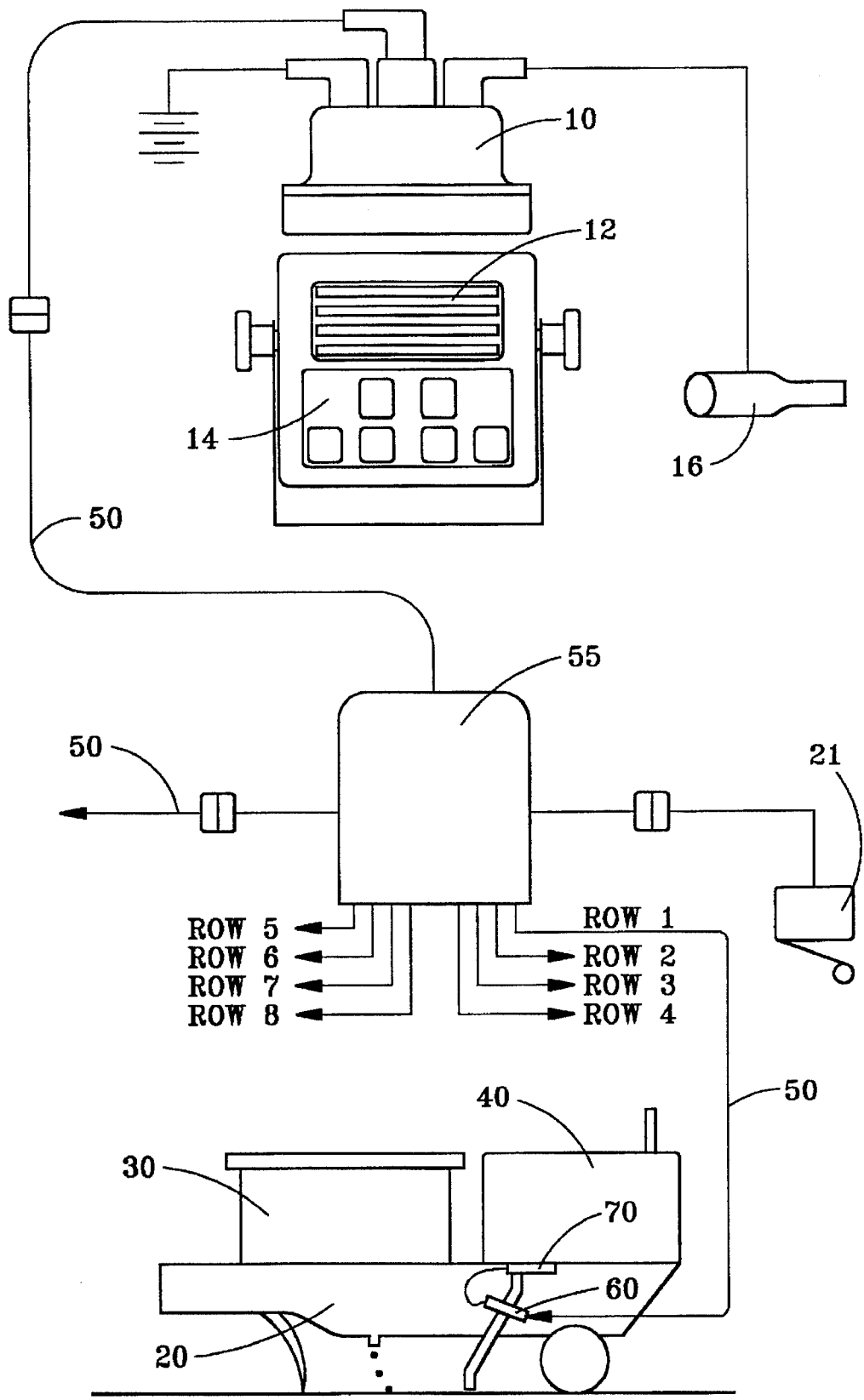
FIG. 1 is a simplified diagram showing a material dispensing system incorporating the present invention.

FIG. 1 shows a simplified diagram of a planter 20 incorporating a distributed control material dispensing system. The material dispensing system of the present invention may be used with other types of agricultural implements, but is primarily used with seed planting equipment. Although the FIGURES show a single row of planting equipment, typical planters include multiple rows, up to 24.

The distributed control system consists of a main microcontroller 10 which communicates to a plurality of sub-controllers 60. The sub-controllers 60 implement commands received from the main control unit 10 by applying electric power to a metering device 72. The pesticide container 40 contains a memory device 85 for retaining information pertaining to the material in the container 40 and to the metering device 72. This information is used by the main control unit 10 and the sub-controllers 60 to properly dispense the pesticide.

The material dispensing system shown in the FIGURES is a distributed control system that employs a master microcontroller computer 10 located in the operator's cab. Typically, the material dispensing system is used in conjunction with a seed planter 20 which is attached to and pulled by a farmer's tractor (not shown). Each row of the seed planter 20 includes a seed hopper and seed planting mechanism 30 and a pesticide container and associated dispensing mechanism 40. Pesticides include, but are not limited to, insecticides, herbicides, fungicides, fertilizers and other agricultural chemicals. This master or main controller 10 distributes command and control information via a high speed serial communications link 50 to a plurality of individual meter systems 70. A typical agricultural planter may have up to 24 rows of seed hopper and seed planting mechanisms 30 and pesticide containers 40. Each row corresponds to one row in the field being planted. Each individual meter system 70 is controlled by its own slave or row controller 60. The meter system 70 consists of an electronic memory circuit 80 and a metering or dispensing device 72. The meter system 70 is permanently attached to the pesticide container 40. Preferably, the meter system 70 is attached using a known tamper evident securing system. The row controller 60 includes a material flow sensor 62 which is integral with the row controller 60. The material flow sensor 62 detects the presence or absence of flow from the pesticide container 40.

The distributed control material dispensing includes a main microcontroller unit 10 with a display 12 and keypad 14 for operator interface. A radar 16 is connected to the main control unit 10 to provide ground speed. Ground speed is used to modify the material dispensing rate to account for the planter's speed. The main control unit 10 is connected to a junction box 55 by a high speed serial communications link 50. The main controller 10 is in constant communication through the serial communications link 50 to the row control units 60 located on the planter 20.

The row control units 60 allow a method of multiplexing signals going to the main controller 10. A main benefit is that the main controller 10 can control a 24 row planter with only nine wires going to a junction box 55. One pair of wires is used for serial communications, three pairs of wires are provided for power to the row control units 60 and to the metering devices 72. One wire is provided for the lift switch 21. Three pairs of wires are used for power to more evenly distribute the current requirements.

The main controller 10 also contains a non-volatile memory unit, typically known as "flash" memory. Information pertaining to the usage and application of pesticides is stored in this non-volatile memory unit. This information is used to prepare printed reports which meet EPA reporting requirements. Currently, farmers prepare these written reports manually.

The junction box 55 is connected by additional portions of the serial communications link 50 to a plurality of slave or sub-controller units 60. Each slave unit 60 is associated with one row of the planter 20, and is therefore referred to as a row control unit 60. The preferred junction box 55 can connect up to eight row control units 60 to the main control unit 10. If the planter 20 has more than eight rows, additional junction boxes 55 are connected in series to the first junction box 55. A lift switch 21 is connected to the first junction box 55. This switch indicates when the planter 20 is not in an operating position. Other interfaces to the main control unit 10 may be provided such as serial or parallel links for transmitting information to other computer systems or printers.

The row control unit 60 has memory devices and logic devices within to modify and implement the commands from the main controller 10. The row control unit 60 reads information from a container memory circuit 80 attached to the pesticide container 40 and manipulates the commands from the main controller 10 to properly operate the metering device 72. For example, if the concentration of pesticide on row 1 is different than the concentration of pesticide on row 8, the row control unit 60 can modify the commands of the main controller 10 to properly dispense pesticides from all rows. The row control unit 60 also reads metering device 72 calibration data from the container memory circuit 80 and modifies the main controller 10 commands to account for differences in performance of different metering devices.

The row control unit 60 allows the possibility to completely change the programmed functions of the main controller 10. As an example, if a pre-programmed row control unit 60 is placed on a liquid herbicide sprayer, the main controller 10 would be able to read the dispenser type information and operate as a liquid sprayer controller.

The preferred embodiment shown in the FIGURES uses one row control unit 60 to control one metering device and memory unit 70. A row control unit 60 can control more than one device, for example, two metering device and memory units 70 or one metering device and memory unit 70 and one seed hopper and seed planting mechanism 30.

Each pesticide container 40 includes a metering or dispensing device 72 which allows controlled application rates under different conditions. The metering device 72 described herein is an electromechanical solenoid driven device for dry granular material. Other type of dispensers may be used for other materials, such as liquids. One type of metering device for dry granular material is described in U.S. Pat. No. 5,156,372, Metering Device for Granular Material.

Figure 2:
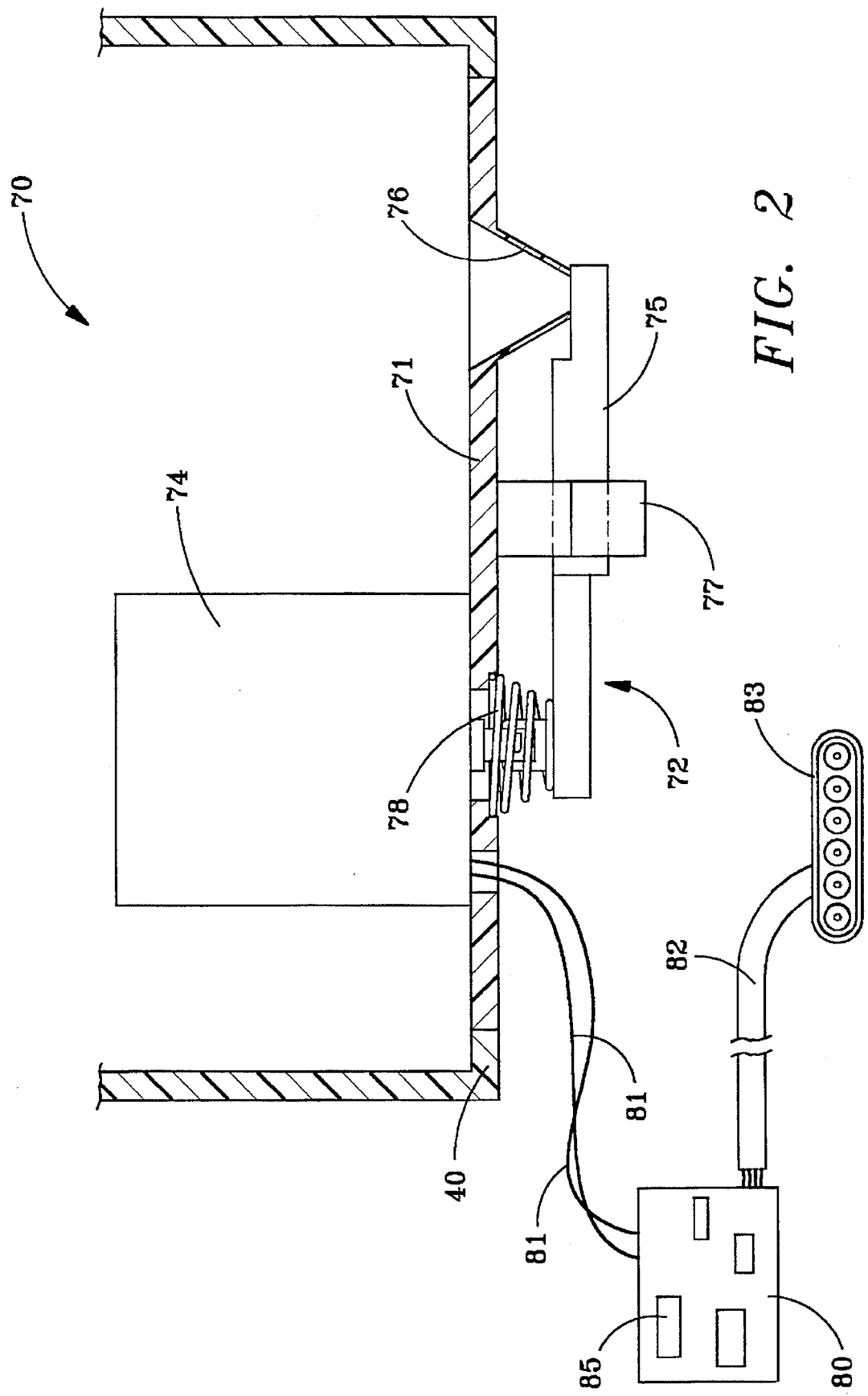
FIG. 2 is a side view of one embodiment of an electromechanical dispensing device for use with the material dispensing system shown in FIG. 1.
Figure 3:
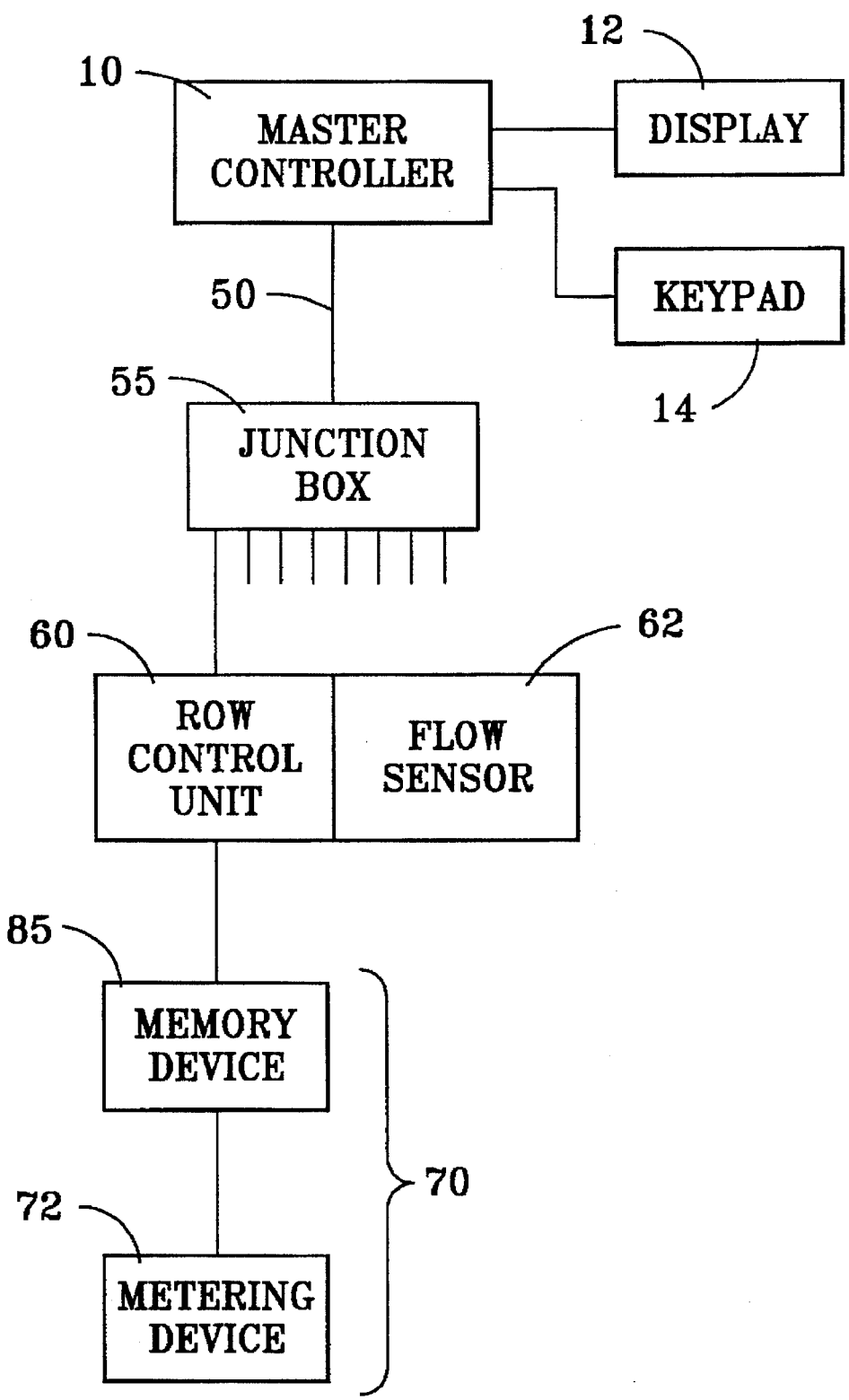
FIG. 3 is a schematic diagram of the distributed controller system for the material dispensing system shown in FIG. 1.

A side view of the metering device and memory unit 70 is shown in FIG. 2. A base plate 71 is fastened to the bottom of the pesticide container 40. An electromechanical metering device 72 is attached to the base plate 71. The preferred metering device 72 uses an electric solenoid 74. The solenoid 74 is attached to one end of a pivot bar 75 which pivots on pivot support 77. The other end of the pivot bar 75 is biased into contact with material dispensing aperture 76 by a spring 78. The solenoid 74 is energized by the row control unit 60 to pivot the pivot bar 75 away from the material dispensing aperture 76, thereby allowing pesticide to flow by gravity out of the pesticide container 40.

The solenoid 74 must be sealed from the pesticide. Pesticide entering the solenoid 74 can cause its premature failure. The solenoid end of the pivot bar 75, the spring 78 and the connection of the pivot bar 75 to the solenoid 74 are sealed by a cover (not shown) to prevent entry of pesticide into the solenoid 74. The preferred method for pivoting the pivot bar 75 and sealing the solenoid cover is to include a round flexible washer (not shown) in the pivot support 77. This flexible washer, sometimes referred to a living hinge, has a small hole in the center, smaller than the diameter of the pivot bar 75. The pivot bar 75 is inserted through the small hole in the flexible washer. The flexible washer allows the pivot bar 75 to pivot and seals the solenoid cover from the pesticide.

An electronic memory circuit 80 is connected to the solenoid 74. A multi-conductor cable 82 and connector 83 are used to connect the electronic memory circuit 80 to the row control unit 60. In one embodiment of the present invention, the row control unit 60 directly applies electrical power to the solenoid 74 through power wires 81. In addition to connecting the row control unit 60 solenoid power to the solenoid 74, the electronic memory circuit 80 also includes a non-volatile memory device 85. The memory device 85 preferably is an E PROM, a non-volatile memory device that is electrically erasable programmable memory, also referred to as EEPROM or $E^2$ PROM.

The combination of the electronic memory 85 and the pesticide container 40 with attached metering device 72 creates a material container capable of electronically remembering and storing data important to the container, the material dispensing system, and the pesticide. Among the data which could be stored are: a serial number unique to that container, pesticide lot number, type of pesticide, metering calibration, date of filling, quantity of material in the container, quantity of material dispensed including specific rates of application, fields treated. This stored data can be recalled and updated as needed. The stored data can also be used by a metering controller or pumping system by accessing specific calibration numbers unique to the container and make needed adjustments, by sounding alarms when reaching certain volume of pesticide in a container, or keeping track of usage of the container to allow scheduling of maintenance.

An alternate embodiment of the electronic memory circuit 80 includes a means for blocking the application of electrical power to the solenoid 74, to assure that the solenoid 74 is only energized by the material dispensing system. The electronic memory circuit 80 can include an additional logic device which will only apply power to the solenoid 74 when a permissive control signal or command data is received from the row control unit 60.

In operation, the main control unit 10 receives a desired dispensing rate from the operator via the display 12 and keypad 14. The main control unit 10 monitors the planter's 20 ground speed by the radar unit 16. Using the desired dispensing rate, the ground speed and basic dispensing characteristics for the metering device 72, command data for the row control units 60 are prepared. The preferred dispensing control for a solenoid type metering device 72 is to use a fixed rate for actuating the metering device 72, 0.5 seconds, and vary the on time (or duty cycle) of the metering device, 10% to 50%. The row control unit 60 modifies the duty cycle specified by the main control unit 10 to account the actual metering device 72 calibration data which was retrieved from the memory device 85. The row control unit 60 continues to operate the metering device 72 at the rate and duty cycle specified by the main control unit 10 until new commands are received from the main control unit 10. The main control unit 10 also calculates the quantity of material remaining in the pesticide container 40.

The row control unit 60 has a flow sensor 62 as part of its electronic circuits. The flow sensor 62 senses the flow of material from the pesticide container 40. The main control unit 10 can monitor the flow sensors 62 and generate visual and audible alarms as required. The flow sensor 62 consists of an infra-red light source positioned across from an infra-red light detector. These two components are mounted on a printed circuit board which is part of the row control unit 60. A hole is made in the board between the light source and the light sensor. The dispensed pesticide is guided through this hole by a light transparent tube. The logic circuit associated with the flow sensor 62 monitors for the presence of flow by intermittent interruptions of the light reaching the light sensor. Since the pesticide is dispensed as granular particles, proper flow will cause intermittent interruptions of the light. A non-interrupted light will signal no material flowing from the pesticide container 40. A completely interrupted light will indicate a blockage of the tubing after the flow sensor 62.

To operate the material dispensing system, it is necessary for the main control unit 10 to uniquely identify the row control unit 60, metering device and memory unit 70 pairs. Each metering device and memory unit 70 includes a unique electronic serial number in the memory device 85. Each row control unit 60 also has a unique electronic serial number. When the material dispensing system is initialized, the main control unit 10 must poll or query all the metering device and memory units 70 and row control units 60 to determine by serial number which units 70, 60 are attached to the planter 20. This is sufficient identification for the system to function. In the preferred embodiment, the operator should be able to refer to a row and its associated seed and material dispensing equipment as row x, rather than by the serial number of the metering device and memory unit 70 or by the serial number of the row control unit 60. To associate a particular metering device and memory unit 70 and row control unit 60 to a particular row, a row configuration method is provided.

The main control unit 10 is initialized in a configuration mode with no row control units 60 connected. The row control units 60 are then connected to the main control unit 10 via the junction box(es) 55 one at a time in the order in which the operator would like them to represent. The first row control unit 60 connected would represent row one. This allows an operator who prefers to work from left to right to have the left most row row 1 and an operator who prefers to work from right to left to have the right most row row 1.

With a many as 24 rows on a planter 20, it is necessary to control or limit the current drawn by the metering solenoids 74. If all 24 solenoids were operated simultaneously, the current demands could exceed the capacity of the operator's tractor.

The rate at which the metering device 72 is operated is typically 0.5 seconds. The metering device 72 is actually activated at a 10% to 50% duty cycle (10% to 50% of the rate). The solenoid is turned on at 0.5 second intervals for 0.05 to 0.25 seconds. The preferred method of varying the dispensing rate is to keep the rate fixed and vary the duty cycle. Minimum current demand can be achieved by sequencing the activation of each metering device 72. The optimum sequence time is defined as: Rate/Number of Rows. For a 4 row system operating at a rate of 0.5 seconds, the sequence time is 0.125 seconds (0.5 seconds/4). This means that the metering devices 72 are started at 0.125 second intervals. A variation of this sequencing is to divide the metering devices 72 into groups, and stagger the starting times of each group.

The system operates in the following manner: Material dispensing begins with the main control unit 10 sending each row control unit 60 a "start" command at the appropriate time (the sequence time). The row control unit 60 does not actually receive and use the sequence time value. Because of variations in the operation of the multiple row control units 60, the row control units 60 will drift away from the ideal sequencing. It is necessary to periodically issue a "re-sync" at approximately one minute intervals and basically restart each metering device 72 which re-synchronizes each row control unit 60 back to the main control unit's 10 time base.

An alternate power sequencing method requires the main control unit 10 to send a sequence time or delay time to each row control unit 60. The main control unit 10 then sends a start command to all row control units 60 simultaneously. Each row control unit 60 then activates the associated metering device 72 after the time delay previously specified. The material dispensing system features and capabilities include:

Controls application rate of material under varying operating conditions. The application rate can be set by the operator from an operator's console or can be automatically read from the material container meter unit. The later technique offers an advantage in that it does not allow the operator to enter an incorrect application rate.

The system will not allow material application if the material identification number for all rows do not match. This prevents inadvertent application of two different pesticides.

Provides actual ground speed information if a ground speed sensor is attached. Typical ground speed sensor include wheel rpm and radar. In lieu of a ground speed sensor, a fixed planting speed may be entered and used to distribute the granular pesticide material.

The system monitors material flow and alerts the operator to no flow, empty container, or blocked flow conditions.

The system monitors and tracks container material level for each row.

The system provides control information and data to a non-volatile memory for future downloading.

The system monitors the planter to allow pesticide to be applied only when the planter is in the planting position.

A typical usage for this system is:

1) For a new pesticide container, the metering device and memory unit 70 is attached to the pesticide container 40 by either the container manufacturer or at the container filling site.

2) A computer is connected to the metering device and memory unit 70 at the time of filling. The following information is electronically stored in memory device 85:

Date

EPA chemical ID numbers

Container serial number

Suggested doses, such as ounces per acre for root worm, or ounces per acre for ants, etc. These rates are specified by EPA.

Meter calibration information, depending on type of metering device

Tare weight of the container

Weight of the full container

3) The container is sealed and prepared for shipping.

4) The end user, the farmer, buys the chemical container from a distributor. The distributor connects the metering device and memory unit 70 to a computer and stores the buyer's EPA registration number, distributor's ID number and date in the metering device and memory unit 70.

5) The end user takes the pesticide container 40 and attaches to dispensing implement, such as planter, sprayer, nurse tank, etc. The main controller 10 compares the user's EPA registration number with the EPA registration stored in metering device and memory unit 70. If the registration numbers do not match, the material dispensing system will not function. The main controller 10 receives the information from the metering device and memory unit 70 pertaining to proper application rates and prompts the user to pick the desired rate. The row control unit 60 reads the metering device calibration information from the metering device and memory unit 70. This information is used in combination with commands from the main controller 10 to properly control the operation of the metering device 72. The main controller 10 prompts the user to enter estimated amount of acreage to be covered. The amount of pesticide remaining in the containers 40 is checked and an alarm is generated if the amount in the containers is not enough to cover the estimated acreage. The user then enters a field ID number and any other required information such as number of rows, width between rows, etc, The user applies the pesticide to the field. The main controller 10 monitors the ground speed and changes the amount being dispensed to keep a constant rate per acre. When the user finishes a field, additional fields may be treated. Field data, including field ID number, crop treated and quantity applied is recorded in the main controller's 10 non-volatile memory. This information may also be recorded in the metering device and memory unit 70 for later use by the distributor or pesticide supplier.

6) The empty or partially used pesticide container 40 is returned to the distributor. Either the recorded usage information or the current weight of the container can be used to determine a credit for any unused pesticide.

Having described the invention, what is claimed is:

1. A system for dispensing dry agricultural chemicals comprising:
    a master controller;
    a plurality of chemical containers, each chemical container including therein means for dispensing chemical at a metered rate from said container directly to a field;
    a plurality of secondary controllers for actuating the means for dispensing chemical, each secondary controller receiving command data from the master controller and controlling the means for dispensing in response to said command data.

2. The system, according to claim 1, wherein each secondary controller is associated with one chemical container.

3. The system, according to claim 1, wherein each secondary controller is associated with at least two chemical containers.

4. The system, according to claim 1, wherein the secondary controller receives calibration data for the means for dispensing a and uses the calibration data in combination with the command data to control said means for dispensing.

5. The system, according to claim 1, wherein each chemical container includes means for retaining selected operating data, the selected operating data including an identifying serial number and calibration data for said means for dispensing.

6. The system, according to claim 1, wherein each said means for dispensing includes an electromechanical apparatus,' the application of actuation power to said electromechanical apparatus being controlled by one of said plurality of secondary controllers.

7. The system, according to claim 1, wherein each of said plurality of secondary controllers, at pre-determined intervals, applies electrical power to the metering means for a pre-determined time.

8. The system, according to claim 7, wherein the master controller receives input data, including type of agricultural chemical being dispensed and application rate for said agricultural chemical, and determines the electrical power application time and the time interval between such electrical power applications in response thereto.

9. The system, according to claim 1, wherein the secondary controller includes means for sensing the flow of agricultural chemical from said chemical container.

10. The system, according to claim 9, wherein the secondary controller includes an electronic circuit board, the means for sensing the flow of agricultural chemical being integral with the electronic circuit board.

11. A system for dispensing dry agricultural chemicals comprising:
    a master controller;
    a plurality of chemical containers, each chemical container included therein means for metered dispensing of chemical directly to a field and means for retaining selected operating data, the selected operating data including an identifying serial number and calibration data for said means for metered dispensing;
    a plurality of secondary controllers for actuating the means for metered dispensing; each secondary controller receiving command data from the master controller; receiving calibration data for said means for dispensing from the means for retaining selected operating data; and controlling the means for dispensing in response to said command data and said calibration data.

* * * * *